United States Patent
Bhattacharyya et al.

(10) Patent No.: US 11,321,624 B2
(45) Date of Patent: May 3, 2022

(54) METHOD AND SYSTEM FOR ANALYZING INTERNET OF THINGS (IOT) DATA IN REAL-TIME AND PROVIDING PREDICTIONS

(71) Applicant: Wipro Limited, Bangalore (IN)

(72) Inventors: Sandipan Bhattacharyya, Kolkata (IN); Deepalakshmi Ranganathan, Vellore (IN)

(73) Assignee: Wipro Limited, Bangalore (IN)

( * ) Notice: Subject to any disclaimer, the term of this patent is extended or adjusted under 35 U.S.C. 154(b) by 646 days.

(21) Appl. No.: 16/180,979

(22) Filed: Nov. 5, 2018

(65) Prior Publication Data
US 2020/0090070 A1 Mar. 19, 2020

(30) Foreign Application Priority Data
Sep. 19, 2018 (IN) .............................. 201841035359

(51) Int. Cl.
*G06N 7/02* (2006.01)
*H04L 67/12* (2022.01)

(52) U.S. Cl.
CPC .............. *G06N 7/023* (2013.01); *H04L 67/12* (2013.01)

(58) Field of Classification Search
CPC combination set(s) only.
See application file for complete search history.

(56) References Cited

U.S. PATENT DOCUMENTS 7,698,055 B2 4/2010 Horvitz et al.
9,557,723 B2 1/2017 Nasle

OTHER PUBLICATIONS

P, "Streaming Analytics over Real-Time Big Data", Global Journal of Computer Science and Technology, 2015, 6 pages, vol. 15, Issue 5, Version 1.0, Global Journals, Inc. (USA).
Banerjee, "Real-Time Streaming Analytics for Telecom: The Essential Guide", White Paper, May 2014, 12 pages, Heavy Reading.
Skidanov et al., "A Column Store Engine for Real-Time Streaming Analytics", 2016, 1 page, IEEE.

*Primary Examiner* — Robert G Bachner
(74) *Attorney, Agent, or Firm* — Finnegan, Henderson, Farabow, Garrett & Dunner, LLP

(57) ABSTRACT

This disclosure relates to method and system for analyzing IoT data in real-time and predicting future events. In one embodiment, the method may include acquiring the real-time IoT data corresponding to one or more IoT devices, and building a predictive model based on the real-time IoT data. The predictive model may include a machine learning algorithm that generates an output parameter representing a future event based on a set of input parameters derived from the real-time IoT data. The predictive model may be built by training the predictive model for one or more explanatory input parameters and an expected output parameter. The method may further include predicting the future event based on the real-time IoT data using the predictive model, determining a deviation between the future event and an actual event, and tuning the predictive model based on the deviation.

12 Claims, 5 Drawing Sheets

METHOD AND SYSTEM FOR ANALYZING INTERNET OF THINGS (IOT) DATA IN REAL-TIME AND PROVIDING PREDICTIONS

This application claims the benefit of Indian Patent Application Serial No. 201841035359, filed Sep. 19, 2018, which is hereby incorporated by reference in its entirety.

FIELD

This disclosure relates generally to Internet of Things (IoT), and more particularly to method and system for analyzing IoT data in real-time and providing predictions.

BACKGROUND

The Internet of Things (IoT) is an emerging technology, combining various physical devices (also referred to as IoT devices) with the Internet to form a huge network. The IoT devices may include, but may not be limited to, wearable devices, vehicles, home appliances, and so forth. The IoT devices are embedded with electronics, software applications, sensors, actuators, etc. so as to enable the IoT devices to connect and exchange data.

Companies are increasingly tapping IoT solutions and services in order to boost their operational efficiencies and transform their business models. For example, with rapid penetration of IoT in today's world, real-time streaming data has become a reality. The real-time streaming data may enable the companies to analyze the data as soon as they arrive, which, in turn, may enable them to bring out deeper insights about their business processes, customer behavior, and competition. However, current techniques are limited to establishing simple business rules on the streaming and IoT data. For example, current techniques do not provide for advance analytics on real-time IoT data so as to generate actionable insights.

SUMMARY

In one embodiment, a method for predicting future events by analyzing real-time Internet of things (IoT) data is disclosed. In one example, the method may include acquiring the real-time IoT data corresponding to one or more IoT devices. The method may further include building a predictive model based on the real-time IoT data. The predictive model may include a machine learning algorithm that generates an output parameter representing a future event based on a set of input parameters derived from the real-time IoT data. The predictive model may be built by training the predictive model for one or more explanatory input parameters and an expected output parameter. The method may further include predicting the future event based on the real-time IoT data using the predictive model. The method may further include determining a deviation between the future event and an actual event. The method may further include tuning the predictive model based on the deviation.

In one embodiment, a system for predicting future events by analyzing real-time IoT data is disclosed. In one example, the system may include an analytics and prediction device, which may further include at least one processor and a memory communicatively coupled to the at least one processor. The memory may store processor-executable instructions, which, on execution, may cause the processor to acquire the real-time IoT data corresponding to one or more IoT devices. The processor-executable instructions, on execution, may further cause the processor to build a predictive model based on the real-time IoT data. The predictive model may include a machine learning algorithm that generates an output parameter representing a future event based on a set of input parameters derived from the real-time IoT data. The predictive model may be built by training the predictive model for one or more explanatory input parameters and an expected output parameter. The processor-executable instructions, on execution, may further cause the processor to predict the future event based on the real-time IoT data using the predictive model. The processor-executable instructions, on execution, may further cause the processor to determine a deviation between the future event and an actual event. The processor-executable instructions, on execution, may further cause the processor to tune the predictive model based on the deviation.

In one embodiment, a non-transitory computer-readable medium storing computer-executable instructions for predicting future events by analyzing real-time IoT data is disclosed. In one example, the stored instructions, when executed by a processor, may cause the processor to perform operations including acquiring the real-time IoT data corresponding to one or more IoT devices. The operations may further include building a predictive model based on the real-time IoT data. The predictive model may include a machine learning algorithm that generates an output parameter representing a future event based on a set of input parameters derived from the real-time IoT data. The predictive model may be built by training the predictive model for one or more explanatory input parameters and an expected output parameter. The operations may further include predicting the future event based on the real-time IoT data using the predictive model. The operations may further include determining a deviation between the future event and an actual event. The operations may further include tuning the predictive model based on the deviation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
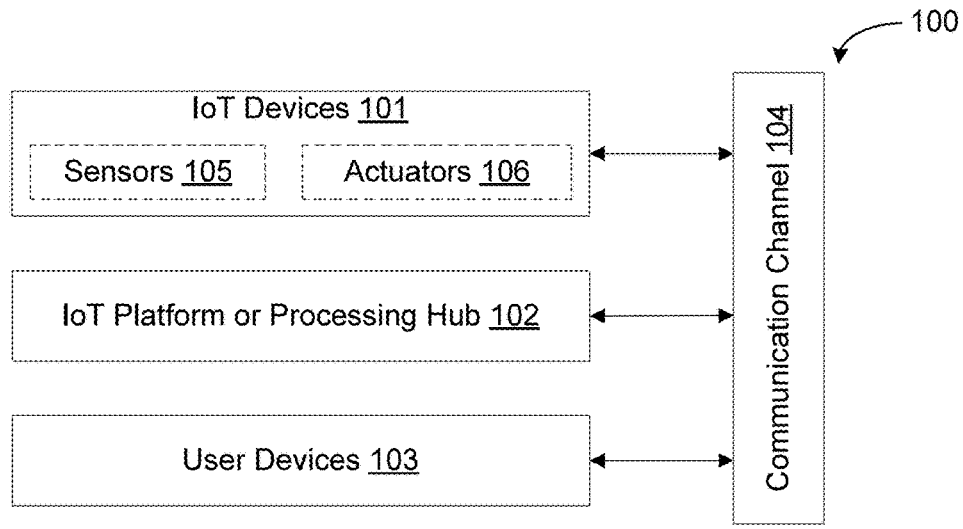
FIG. 1 is a block diagram of an exemplary system for analyzing Internet of things (IoT) data in real-time and providing predictions, in accordance with some embodiments of the present disclosure.

Referring now to FIG. 1, an exemplary system 100 for analyzing Internet of things (IoT) data in real-time and providing predictions is illustrated in accordance with some embodiments of the present disclosure. The system 100 may include one or more IoT devices 101, an IoT platform or processing hub 102, and one or more user devices 103 in communication with each other over a communication channel 104. The system may be implemented in a number of industry verticals including, but not limited to, manufacturing, energy, utilities, wearables, healthcare, security, smart homes or smart buildings or smart offices, and retail. As will be appreciated, IoT may allow objects to be sensed or controlled remotely across existing network infrastructure, thereby creating opportunities for more direct integration of the physical world into computer-based systems, and resulting in improved efficiency, accuracy and economic benefit in addition to reduced human intervention.

The IoT devices 101 may include, but may not be limited to, sensors 105 and actuators 106. The sensors 105 may detect any change in the ambient environment based on which the actuators 106 may trigger an appropriate response. The IoT devices 101 may be administered via the IoT platform or processing hub 102. For example, the data captured by the sensors 105 may be sent to the IoT platform 102 for subsequent processing. Further, for example, the actuators 106 may receive instructions or processed data from the IoT platform 102 for triggering the appropriate response. It should be noted that the IoT devices 101 may send or receive data from the IoT platform 102 over the communication channel 104 either directly or via an intermediary gateway.

As will be appreciated, IoT platform 102 may ensure elastic scalability across any number of endpoints (i.e., IoT devices 101) as per the requirement. Such elastic scalability may also involve zero-downtime scalability procedure and, in case of on-premises deployment, efficient load balancing for maximized performance of the server cluster. Additionally, the IoT platform 102 may ensure seamless integration with different hardware by using a range of popular communication protocols, applying different types of topology (direct connect or gateway) and using SDKs when necessary.

Further, the IoT platform or processing hub 102 may implement an analytics and prediction device for performing analysis of IoT data in real-time and for predicting future events, in accordance with some embodiments of the present disclosure. As will be described in greater detail in conjunction with FIGS. 2-5, the analytics and prediction device may acquire the real-time IoT data corresponding to one or more IoT devices, and build a predictive model based on the real-time IoT data. The predictive model may include a machine learning algorithm that generates an output parameter representing a future event based on a set of input parameters derived from the real-time IoT data. The predictive model may be built by training the predictive model for one or more explanatory input parameters and an expected output parameter. Further, as will be described in greater detail in conjunction with FIGS. 2-5, the analytics and prediction device may predict the future event based on the real-time IoT data using the predictive model, determine a deviation between the future event and an actual event, and tune the predictive model based on the deviation.

The one or more user devices 103 may enable the users (e.g., administrators, analysts, etc.) to interact with the system 100. For example, the administrators may administer the one or more IoT devices 101 through the IoT platform 102. Similarly, the analysts may view various predictions generated by the IoT platform 102. The reports may be accessed via online or offline reports from the IoT platform 102.

The communication channel 104 may be any wired or wireless communication channel based on different communication technologies. For example, the communication channel may include, but may not be limited to, a direct interconnection, local area network (LAN), wide area network (WAN), cellular network (e.g., code-division multiple access (CDMA), high-speed packet access (HSPA+), global system for mobile communications (GSM), long-term evolution (LTE), WiMax, etc.), wireless network (e.g., using Wireless Application Protocol, IEEE 802.n/b/g/n/x, Bluetooth, Zigbee, etc.), and the Internet.

Figure 2:
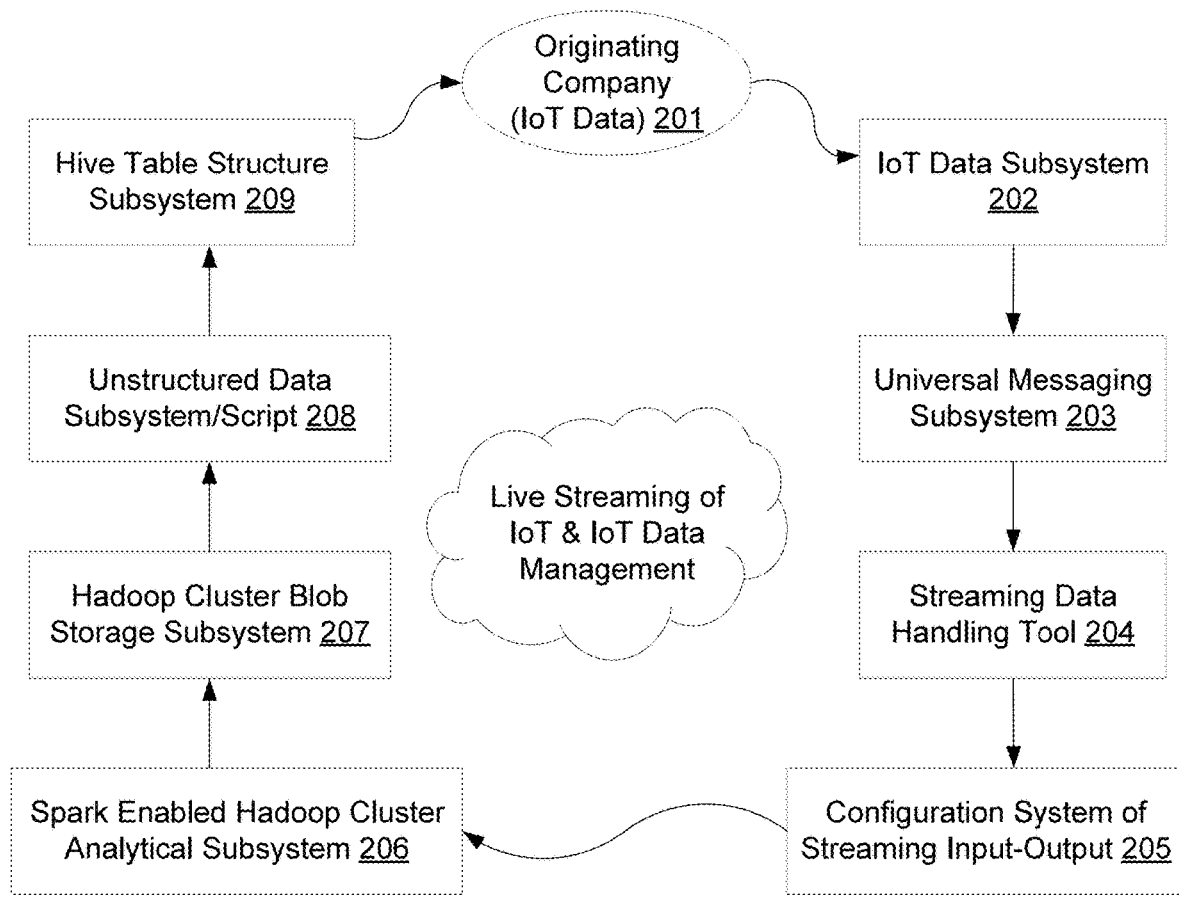
FIG. 2 is a block diagram for streaming of IoT data from IoT devices and loading of IoT data into Big Data environment, in accordance with some embodiments of the present disclosure.

Referring now to FIG. 2, a block diagram for streaming of IoT data from IoT devices and loading of IoT data into Big Data environment, performed by the IoT platform or processing hub 102 of FIG. 1, is illustrated, in accordance with some embodiments of the present disclosure. As discussed above, an originating company 201 may employ an IoT platform or processing hub for accessing and controlling one or more remote IoT devices. For example, the processing and action management may involve utilization of IoT data with rule-based event-action-triggers enabling execution of 'smart' actions based on specific sensor data received from IoT devices.

In particular, the IoT devices may send a status message every minutes or seconds to an IoT data subsystem 202, based on a pre-defined configuration. The IoT data subsystem 202 may receive data generated by sensor and alert system as a packet. The IoT data subsystem 202 may then transfer the received packet to a universal messaging subsystem 203. It should be noted that universal messaging is a solution for high-performance, low-latency messaging across a wide array of delivery channels, including all mainstream enterprise, web and mobile platforms.

Customized code may listen the universal messaging channel and once the data is received, it may push the result to a highly scalable data streaming platform, capable of receiving and processing millions of events per second. As will be appreciated, real-time data streams need to be listened continuously. The listeners may be scalable flexible, fault tolerant data pipes. In some embodiments, any tool or technology capable of processing real-time big volume of data may be employed. The employed tool 204 may process the machine generated messages as a tile for a predefined time period (i.e., fixed time window).

Typically, machine generated data are in unstructured data format such as json, Avro, parquet, etc. The streaming tool 204 may be employed to process this unstructured message and create file in a Hadoop cluster blob storage subsystem 207. In some embodiments, Spark enabled Hadoop cluster and analytical subsystem 206 may be useful to build machine learning model on big volume of data. Spark excels at iterative computation, enabling MLlib to run fast. MLlib may include high-quality algorithms that leverage iteration, and may yield better results. Additionally, R and Python languages may be leveraged. Thus, the Spark enabled Hadoop cluster and analytical subsystem 206 may include these software as well. Blob Storage (for example, Azure blob storage, AWS S3, etc.) may handle most of the unstructured data, scaling up or down as per changing requirements. It may store any type of unstructured data—numeric or categorical unformatted data, images, videos, audio, documents, and the like—with proven efficacy and efficiency at Exabyte scale.

Unstructured data subsystem or script 208 (e.g., customized R code) may be used to convert the unstructured data file into analytical ready file format (e.g., csv). Whenever new unstructured file arrive to the cluster blob storage subsystem 207, the custom script 208 may convert the new file into csv and send it to the destination blob storage location of the cluster 207. In some embodiments, hive 209 may be employed for maintaining data in a table. Hive external table may point to csv files location in blob storage 207. Thus, all the streaming files in the directory may be viewed as a single table in hive 209.

It should be noted that the IoT platform, various subsystems, and data processing tools described above may be implemented in programmable hardware devices such as programmable gate arrays, programmable array logic, programmable logic devices, or the like. Alternatively, the IoT platform, various subsystems, and data processing tools described above may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for analyzing IoT data in real-time and providing predictions. For example, the exemplary system 100 may analyze IoT data in real-time and provide predictions by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
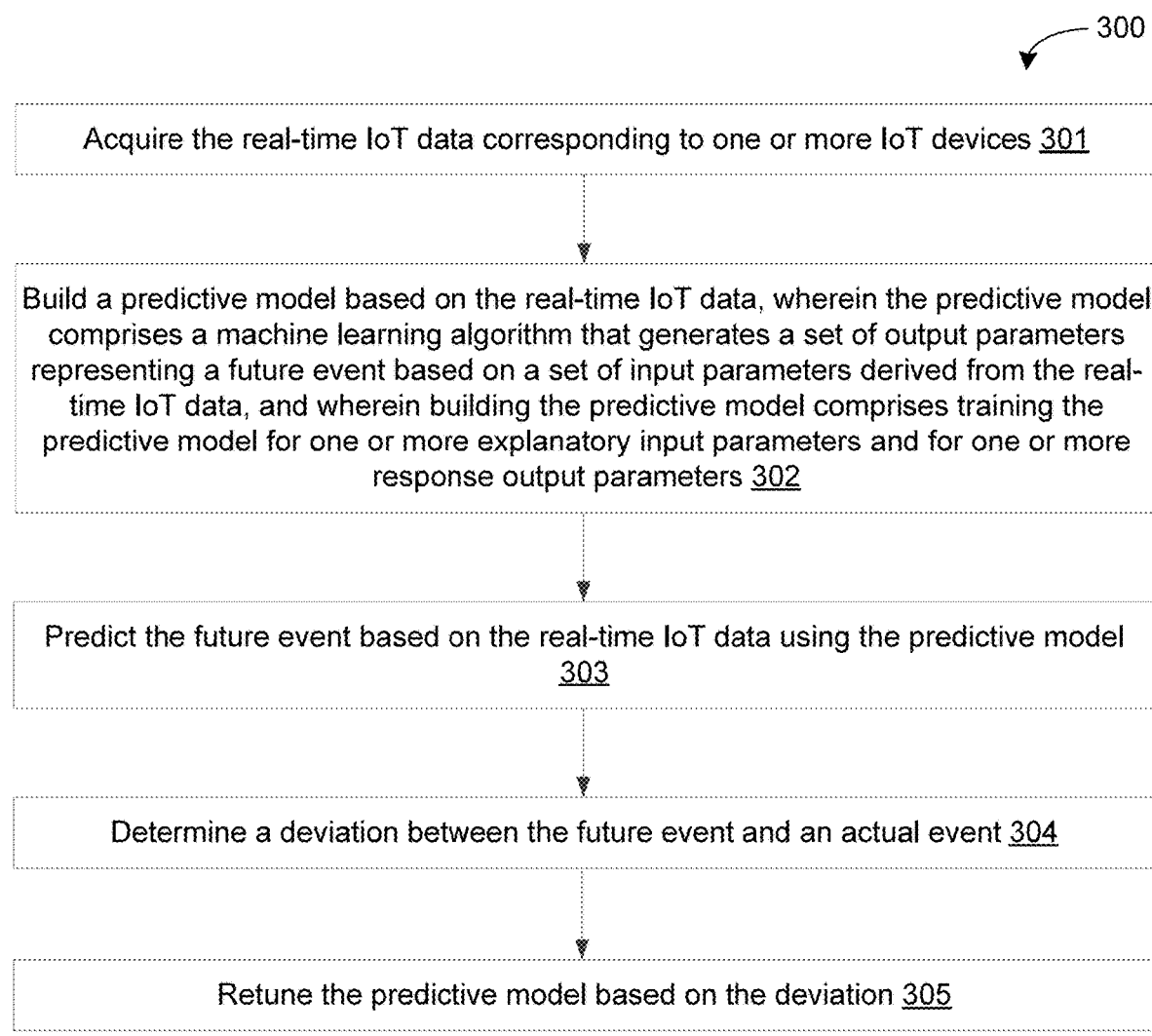
FIG. 3 is a flow diagram of an exemplary process for analyzing IoT data in real-time and providing predictions, in accordance with some embodiments of the present disclosure.

For example, referring now to FIG. 3, exemplary control logic 300 for analyzing IoT data in real-time and providing predictions via a system, such as system 100, is depicted via a flowchart in accordance with some embodiments of the present disclosure. In particular, the control logic 300 may predict future events by analyzing real-time IoT data. As illustrated in the flowchart, the control logic 300 may include the steps of acquiring the real-time IoT data corresponding to one or more IoT devices at step 301, building a predictive model based on the real-time IoT data at step 302, predicting the future event based on the real-time IoT data using the predictive model at step 303, determining a deviation between the future event and an actual event at step 304, and tuning the predictive model based on the deviation at step 305. It should be noted that the predictive model may include a machine learning algorithm that generates an output parameter representing a future event based on a set of input parameters derived from the real-time IoT data. Further, it should be noted that building the predictive model may include training the predictive model for one or more explanatory input parameters and an expected output parameter.

In some embodiments, the control logic 300 may further include the steps of receiving real-time streaming IoT data from the one or more IoT devices through a data streaming platform, and storing the real-time streaming IoT data in a big data warehouse for a pre-defined time period. It should be noted that, in such embodiments, the data streaming platform may be highly scalable. Further, in such embodiments, acquiring the real-time IoT data at step 301 may include the steps of extracting the real-time streaming IoT data from the big data warehouse, transforming the real-time streaming IoT data into a structured data format (e.g., using custom codes for transforming the unstructured data into structured data), and organizing the transformed real-time streaming IoT data in a hive database.

Additionally, in some embodiments, the predictive model may include at least one of a liner regression model, a logistic regression model, a random forest model, or an extreme gradient boosting (XgBoost) model. As stated above, each of the above mentioned models may be a machine learning model capable of generating an output parameter representing a future event based on a set of input parameters derived from the real-time IoT data. Further, at stated above, each of these machine learning models may be trained for one or more explanatory input parameters and an expected output parameter.

Further, in some embodiments, tuning the predictive model at step 305 may include the steps of evaluating one or more characteristic indices of the predictive model within a pre-defined time period, and tuning the predictive model based on the evaluation. In such embodiments, the one or more characteristic indices may include at least one of a population stability index (PSI), a coefficient stability index (CSI), or a Kolmogorov-Smirnov (KS) value. It should be noted that, in some embodiments, all characteristic indices or as many characteristic indices as possible may be employed so as to evaluate health of the prediction model. If the characteristic indices are not performing up to the mark, the predictive model may be improved using machine learning boosting technologies. Moreover, upon tuning the predictive model, the predictions performed by the predictive model may be transferred to end user through online or offline report or notification.

Figure 4:
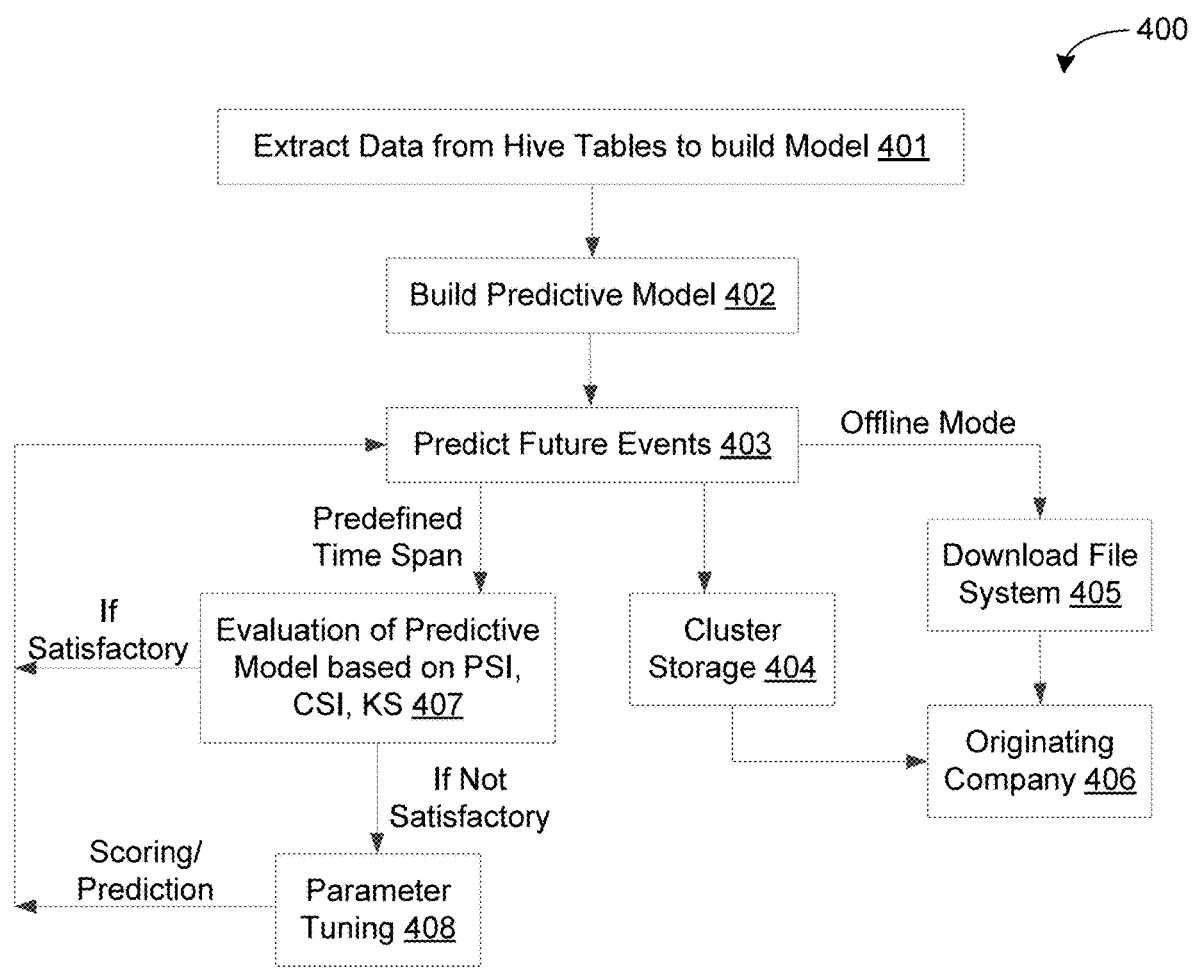
FIG. 4 is a flow diagram of a detailed exemplary process for analyzing IoT data in real-time and providing predictions, in accordance with some embodiments of the present disclosure.

Referring now to FIG. 4, exemplary control logic 400 for analyzing IoT data in real-time and providing predictions is depicted in greater detail via a flowchart in accordance with some embodiments of the present disclosure. As illustrated in the flowchart, at step 401, the control logic 400 may extract IoT data from hive tables so as to build the predictive model. At step 402, the control logic 400 may build machine learning predictive model using the real-time IoT data. The machine learning predictive model may be trained for one or more explanatory input parameters and an expected output parameter so as to generate an output parameter representing a future event based on a set of input parameters derived from the real-time IoT data. As step 403, the control logic 400 may predict future events based on the real-time IoT data using the trained machine learning predictive model. In an offline mode, at step 404, the control logic 400 may send the predicted future events to storage clusters. Contemporaneously, at step 405, the control logic 400 may provide for downloading of the predicted future events as data files from the system. At step 406, the control logic 400 may provide the predicted future event data to the originating company for business improvement.

At step 407, the control logic 400 may provide for evaluation of predictive model based on characteristic indices including, but not limited to, PSI, CSI, or KS value. It should be noted that the evaluation may be performed within a pre-defined time span. If the evaluation is satisfactory at step 407, the control logic 400 may flow back to step 403 for prediction of future events. However, if the evaluation is not satisfactory at step 407, the control logic 400 may perform tuning of various parameters of the machine learning predictive model at step 408. Upon tuning, the control logic 400 may flow back to step 403 for prediction of future events.

As stated above, the machine learning predictive model may be built on real-time streaming IoT data stored in hive with pre-defined time horizon from the history. As will be appreciated, predictive modeling is a process that may employ data mining and probability distribution so as to predict future outcomes. Each predictive model may be made up of many predictors, which are variables that are likely to influence future outputs. Thus, once data has been collected for relevant predictors, a machine learning predictive model may be built. For example, for building machine learning based predictive model, and for deployment and refinement using live streaming IoT data, the analytics and prediction device within the platform may extract the structured IoT data from hive table. The built machine learning predictive model may then be employed to predict future events.

A number of machine learning predictive models may be built along with the above discussed IoT platform so as to predict continuous and categorical responses based on the business requirements. For example, such machine learning predictive models may include, but may not be limited to, linear regression model, logistic regression model, random forest model, and XgBoost model. As will be appreciated, the machine learning predictive model may be built using any of the following software languages or packages: R, Python, and PySpark.

Figure 5A:
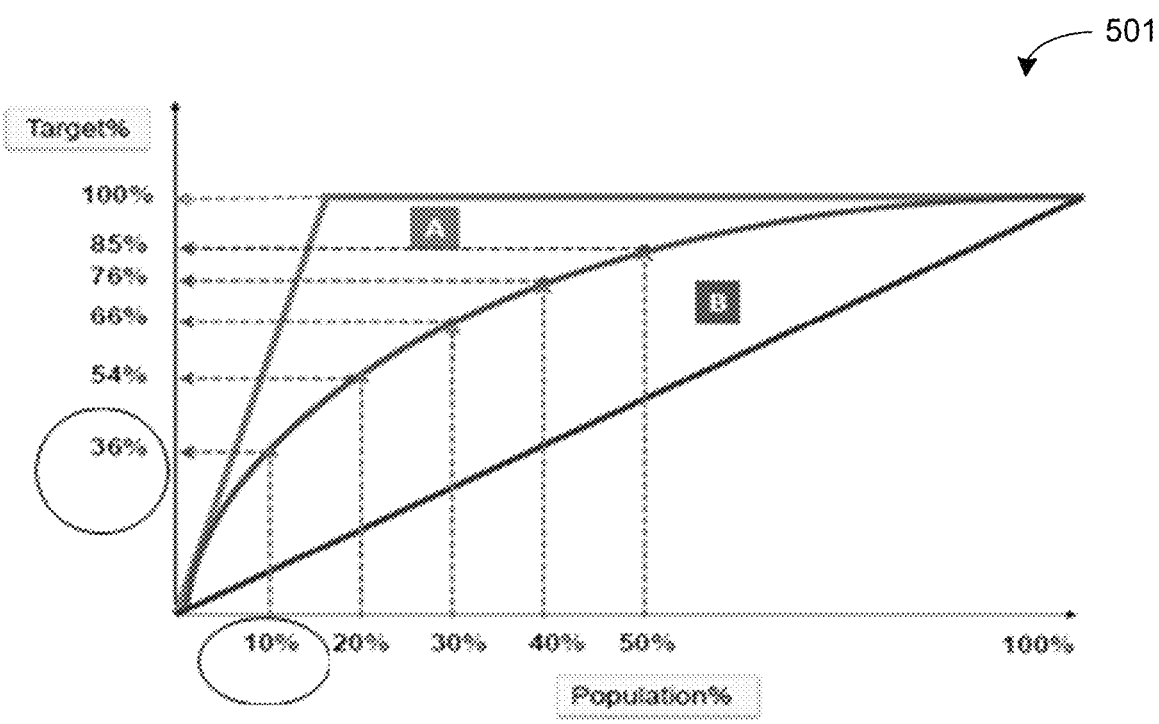
FIGS. 5A and 5B are visual charts for evaluation of performance of predictive models, in accordance with some embodiments of the present disclosure.
Figure 5B:
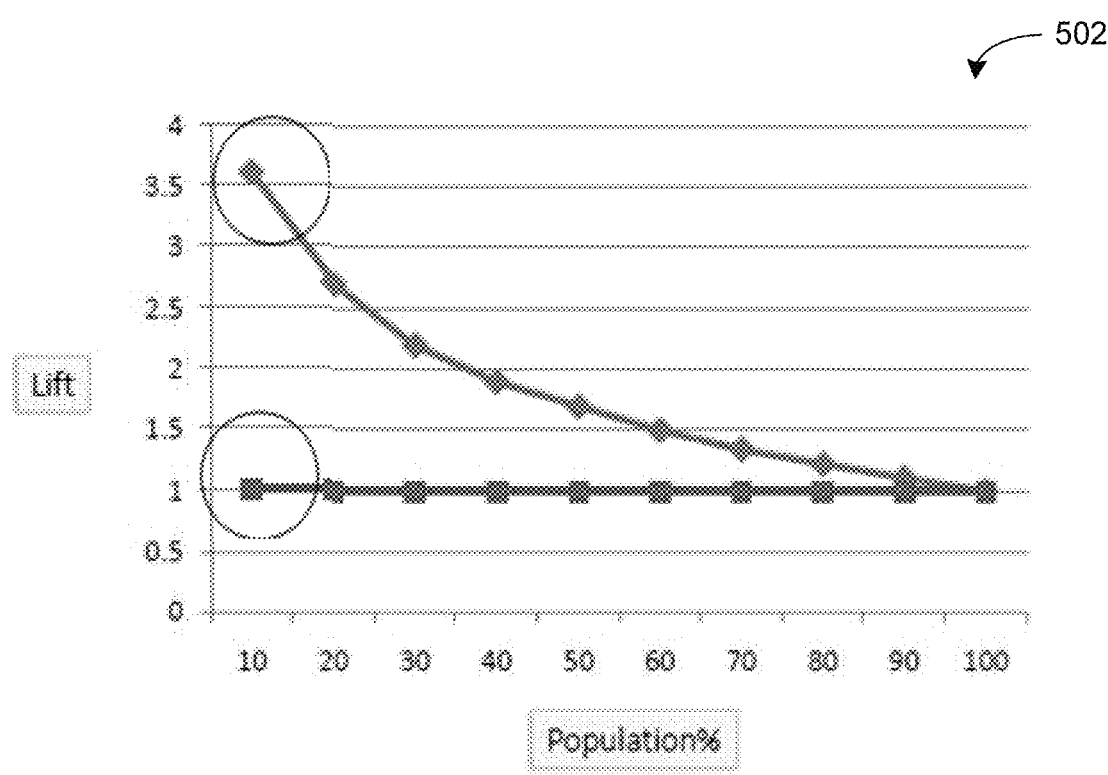

In some embodiments, multiple machine learning predictive models may be compared using standard statistical measures for model evaluation. For example, gain or lift may be a measure of effectiveness of a machine learning predictive model calculated as the ratio between the results obtained with and without the model. Referring now to FIG. 5, gain chart 501 and lift chart 503 may be non-visual or visual aids for evaluating performance of the machine learning predictive models. In some embodiments, the model having highest lift and gain values in top deciles (groups) of the data set based on predictive probability score may be selected as the best machine-learning predictive model. Also, the selected machine learning predictive model may have maximum KS value compared to other models. Upon comparing different machine learning predictive models and selection of the best machine learning predictive model, the selected model may be enabled to predict future events (i.e., business outcomes).

In some embodiments, the results of the prediction may be sent to the end user in offline mode or by providing result as a visualization report. Visualization may be achieved using Tableau or POWER BI and it may be hosted on server for accessing the report over internet in an online mode.

Additionally, as stated above, the built machine learning predictive model may be monitored and evaluated based on different characteristics indices such as PSI, CSI and KS. The planned evolution of machine learning predictive model may occur in a predefined time span. If planned evaluation of the machine learning predictive model is not satisfactory, then parameters of the machine learning predictive model may be tuned. Upon tuning of one or more parameters, scoring and prediction for future events may be performed again by the machine learning predictive model. However, if planned evaluation of the machine learning predictive model is found satisfactory under predefined time span, then feedback may be sent to the machine learning predictive model, which may then provide prediction for future events.

In other words, there may be a continuous monitoring and evaluation of the machine learning predictive model using statistical measures such as PSI, CSI, and KS. If the performance of the prediction downgrades, the model fine tuning and enhancement may be enabled. The machine learning predictive model may be improved by boosting mechanism of machine learning algorithm so as to get a better prediction. Upon improvement, the tuned machine learning predictive model may replace the existing machine learning predictive model in the production and will be operationalize for future usage/targeting.

As will be appreciated, in order to maximize the benefit from IoT data, there is a need for an integrated platform that may leverage ability to collect, analyze and act upon this streaming data in real-time basis. Additionally, the analysis of real-time streaming data needs to be easy so as to capitalize on the benefits of perishable insights generated by IoT.

The techniques, described in various embodiments discussed above, provides for an end-to-end solution for managing the IOT data. In particular, the techniques provides an integrated platform for managing IoT data right from the originating company's system to the real-time analytics enabled platform (e.g., Spark enabled Hadoop cluster). Further, the techniques, described in various embodiments discussed above, provide for advance analytics on the live streaming IoT data using machine learning predictive model. In other words, the techniques integrate IoT technology with machine learning predictive algorithm based advanced analytics.

The techniques further establish a mechanism for developing a machine-learning predictive model, monitoring the model performance over a period of time, and fine tuning the model parameters when it degrades. As will be appreciated, the advantage of machine-learning predictive model over the rule based model is that the machine-learning predictive model may consider all the relevant information, metrics, KPIs available and come up with a single executable probabilistic score while the rule based model may only consider one or very few of the parameters at a time. Such holistic considerations of various parameters with the executable probabilistic score is more effective and efficient in its application (e.g., for targeting).

Further, as will be appreciated, integrating, deploying, and monitoring live streaming IoT data with machine learning predictive models may enable the companies to get on-demand deep insights, which in turn would enable them to carry-out efficient targeting. As will be appreciated, efficient and effective targeting may bring real benefit to the companies and enhance their profitability. Exemplary real-life applications of such set-up may include, but may not be limited to, predicting future machine failures using IoT data flowing out from alert systems for a machine manufacturing company and to minimize machine down-time; real time targeting of customers while they walk into a retail store and to provide them with customized campaign offer so as to enhance over-all campaign return on investment (ROI); and enabling development of a real-time alert system for a water treatment plant when the pollution and odor levels breech the permissible limit so as to help them avoid hefty penalty.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
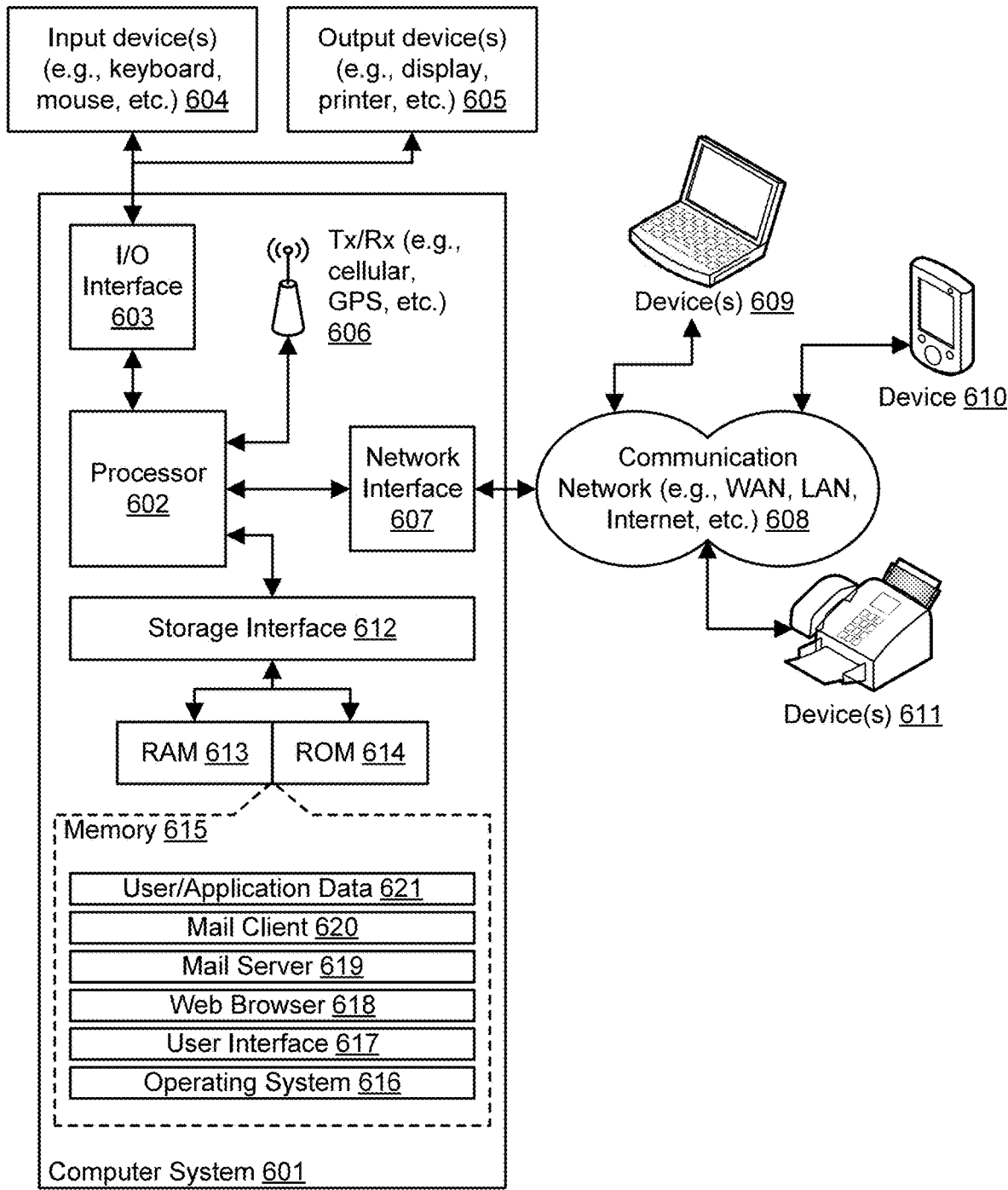
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for analyzing IoT data in real-time and providing predictions. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, Infini- Band, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., IoT data, hive tables, machine learning predictive models, input parameters of the model, output parameters of the model, future events, deviation, characteristic indices, PSI, CSI, KS value, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described method and system for analyzing IoT data in real-time and providing predictions. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A method of predicting future events by analyzing real-time Internet of things (IoT) data associated with a machine-manufacturing-company, the method comprising:
   acquiring, by an analytics and prediction device comprised in an IoT processing hub, the real-time IoT data flowing out from alert sensors within one or more IoT devices employed in the machine-manufacturing-company;
   building, by the analytics and prediction device, a predictive model based on the real-time IoT data, wherein the predictive model comprises a machine learning algorithm that generates an output parameter representing a future event based on a set of input parameters derived from the real-time IoT data, and wherein the building the predictive model comprises training the predictive model for one or more explanatory input parameters and an expected output parameter,
      wherein the predictive model comprises at least one of: a liner regression model, a logistic regression model, a random forest model, and an extreme gradient boosting (XgBoost) model, and wherein the future event is a future machine failure in the machine-manufacturing-company;

predicting, by the analytics and prediction device, the future event based on the real-time IoT data using the predictive model;

determining, by the analytics and prediction device, a deviation between the predicted future event and an actual event;

evaluating a health of the predictive model based on different characteristics indices: a population stability index (PSI), a coefficient stability index (CSI), or a Kolmogorov-Smirnov (KS) value of the predictive model;

tuning, by the analytics and prediction device, at least one of the characteristics indices of the predictive model based on the deviation and the evaluation, wherein the tuned machine learning predictive model is used for predicting a subsequent future machine failure; and enabling, by an action management module of the IoT processing hub, execution of one or more smart actions for scaling down machine down-time by accessing and controlling the one or more IoT devices employed in the machine-manufacturing-company based on rule-based event-action-triggers, corresponding to each of the predicted future-machine-failure in the machine-manufacturing-company.

2. The method of claim 1, further comprising:
receiving real-time streaming IoT data from the one or more IoT devices through a data streaming platform; and
storing the real-time streaming IoT data in a big data warehouse for a pre-defined time period.

3. The method of claim 2, wherein acquiring the real-time IoT data comprises:
extracting the real-time streaming IoT data from the big data warehouse;
transforming the real-time streaming IoT data into a structured data format; and
organizing the transformed real-time streaming IoT data in a hive database.

4. The method of claim 1, wherein the tuning the predictive model further comprises:
evaluating one or more characteristic indices of the predictive model within a pre-defined time period; and
tuning the predictive model based on the evaluation.

5. A system for predicting future events by analyzing real-time Internet of things (IoT) data associated with a machine-manufacturing-company, the system comprising:
one or more IoT devices; and
an IoT processing hub communicatively connected to the one or more IoT devices, the IoT processing hub having:
an analytics and prediction device comprising at least one processor and a computer-readable medium storing instructions that, when executed by the at least one processor, cause the at least one processor to perform operations comprising:
acquiring the real-time IoT data flowing out from alert sensors within the one or more IoT devices employed in the machine-manufacturing-company;
building a predictive model based on the real-time IoT data, wherein the predictive model comprises a machine learning algorithm that generates an output parameter representing a future event based on a set of input parameters derived from the real-time IoT data, and wherein the building the predictive model comprises training the predictive model for one or more explanatory input parameters and an expected output parameter,
wherein the predictive model comprises at least one of: a liner regression model, a logistic regression model, a random forest model, and an extreme gradient boosting (XgBoost) model, and
wherein the future event is a future machine failure in the machine-manufacturing-company;
predicting the future event based on the real-time IoT data using the predictive model;
determining a deviation between the predicted future event and an actual event;
evaluating a health of the predictive model based on different characteristics indices: a population stability index (PSI), a coefficient stability index (CSI), or a Kolmogorov-Smirnov (KS) value of the predictive model;
tuning at least one of the characteristics indices of the predictive model based on the deviation and the evaluation, wherein the tuned machine learning predictive model is used for predicting a subsequent future machine failure; and
an action management configured to enable execution of one or more actions for scaling down machine down-time by accessing and controlling the one or more IoT devices employed in the machine-manufacturing-company based on rule-based event-action-triggers, corresponding to each of the predicted future-machine-failure in the machine-manufacturing-company.

6. The system of claim 5, wherein the operations further comprise:
receiving real-time streaming IoT data from the one or more IoT devices through a data streaming platform; and
storing the real-time streaming IoT data in a big data warehouse for a pre-defined time period.

7. The system of claim 6, wherein acquiring the real-time IoT data comprises:
extracting the real-time streaming IoT data from the big data warehouse;
transforming the real-time streaming IoT data into a structured data format; and
organizing the transformed real-time streaming IoT data in a hive database.

8. The system of claim 5, wherein the tuning the predictive model further comprises:
evaluating one or more characteristic indices of the predictive model within a pre-defined time period; and
tuning the predictive model based on the evaluation.

9. A non-transitory computer-readable medium storing computer-executable instructions for predicting future events by analyzing real-time Internet of things (IoT) data associated with a machine-manufacturing-company, the computer-executable instructions configured for:
acquiring the real-time IoT data flowing out from alert sensors within one or more IoT devices employed in the machine-manufacturing-company;
building a predictive model based on the real-time IoT data, wherein the predictive model comprises a machine learning algorithm that generates an output parameter representing a future event based on a set of input parameters derived from the real-time IoT data, and wherein the building the predictive model comprises training the predictive model for one or more explanatory input parameters and an expected output parameter, wherein the predictive model comprises at least one of: a liner regression model, a logistic regression model, a random forest model, and an extreme gradient boosting (XgBoost) model, and wherein the future event is a future machine failure in the machine-manufacturing-company;

predicting the future event based on the real-time IoT data using the predictive model;

determining a deviation between the predicted future event and an actual event;

evaluating a health of the predictive model based on different characteristics indices: a population stability index (PSI), a coefficient stability index (CSI), or a Kolmogorov-Smirnov (KS) value of the predictive model;

tuning at least one of the characteristics indices of the predictive model based on the deviation and the evaluation, wherein the tuned machine learning predictive model is used for predicting a subsequent future machine failure; and enabling execution of one or more actions for scaling down machine down-time by accessing and controlling the one or more IoT devices employed in the machine-manufacturing-company based on rule-based event-action-triggers, corresponding to each of the predicted future-machine-failure in the machine-manufacturing-company.

10. The non-transitory computer-readable medium of claim 9, wherein the computer-executable instructions are further configured for:

receiving real-time streaming IoT data from the one or more IoT devices through a data streaming platform; and storing the real-time streaming IoT data in a big data warehouse for a pre-defined time period.

11. The non-transitory computer-readable medium of claim 10, wherein acquiring the real-time IoT data comprises:

extracting the real-time streaming IoT data from the big data warehouse;

transforming the real-time streaming IoT data into a structured data format; and organizing the transformed real-time streaming IoT data in a hive database.

12. The non-transitory computer-readable medium of claim 9, wherein the tuning the predictive model further comprises:

evaluating one or more characteristic indices of the predictive model within a pre-defined time period; and tuning the predictive model based on the evaluation.

\* \* \* \* \*